United States Patent
Ooga (10) Patent No.: US 8,774,967 B2
(45) Date of Patent: Jul. 8, 2014

(54) ROBOT CONTROL APPARATUS

(75) Inventor: Junichiro Ooga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 303 days.

(21) Appl. No.: 13/231,619

(22) Filed: Sep. 13, 2011

(65) Prior Publication Data

US 2012/0158179 A1 Jun. 21, 2012

(30) Foreign Application Priority Data

Dec. 20, 2010 (JP) ................... 2010-283372

(51) Int. Cl.
*B25J 13/08* (2006.01)

(52) U.S. Cl.
USPC ........... 700/245; 700/259; 700/264; 901/9; 901/47

(58) Field of Classification Search
USPC .................. 700/245, 259, 264; 901/9, 47
See application file for complete search history.

(56) References Cited

U.S. PATENT DOCUMENTS

| | | | |
|---|---|---|---|
| 6,278,906 B1 * | 8/2001 | Piepmeier et al. | 700/250 |
| 7,613,361 B2 * | 11/2009 | Anabuki et al. | 382/287 |
| 7,630,555 B2 * | 12/2009 | Satoh et al. | 382/201 |
| 7,671,875 B2 * | 3/2010 | Anabuki et al. | 345/633 |
| 7,698,094 B2 * | 4/2010 | Aratani et al. | 702/150 |
| 7,848,850 B2 * | 12/2010 | Hoshino et al. | 700/264 |
| 7,930,067 B2 * | 4/2011 | Miyamoto et al. | 700/264 |
| 2005/0261573 A1 * | 11/2005 | Satoh et al. | 600/415 |
| 2005/0264433 A1 * | 12/2005 | Yokokohji et al. | 340/937 |
| 2006/0071945 A1 * | 4/2006 | Anabuki | 345/633 |
| 2006/0071946 A1 * | 4/2006 | Anabuki et al. | 345/633 |
| 2007/0010913 A1 * | 1/2007 | Miyamoto et al. | 700/264 |
| 2007/0078564 A1 * | 4/2007 | Hoshino et al. | 700/245 |
| 2008/0181485 A1 * | 7/2008 | Beis et al. | 382/153 |
| 2011/0087360 A1 * | 4/2011 | Chen et al. | 700/114 |
| 2012/0158179 A1 * | 6/2012 | Ooga | 700/259 |

FOREIGN PATENT DOCUMENTS

JP  2003-311674  11/2003

OTHER PUBLICATIONS

Japanese Office Action for Japanese Application No. 2010-283372 mailed on Dec. 21, 2013.
Japanese Office Action for Japanese Application No. 2010-283372 mailed on Dec. 21, 2012.

* cited by examiner

*Primary Examiner* — Thomas Black
*Assistant Examiner* — Wae Louie
(74) *Attorney, Agent, or Firm* — Amin, Turocy & Watson, LLP (57) ABSTRACT

According to an embodiment, a target trajectory that takes into account the hardware constraints of a robot is generated, based on results obtained by calculating, temporally interpolating, and estimating image feature amounts from a captured image.

5 Claims, 6 Drawing Sheets

ROBOT CONTROL APPARATUS

CROSS-REFERENCE TO RELATED APPLICATION

This application is based upon and claims the benefit of priority from Japanese Patent Application No. 2010-283372 filed on Dec. 20, 2010 in Japan, the entire contents of which are incorporated herein by reference.

FIELD

Embodiments described herein relate generally to a robot control apparatus that drives a robot with an actuator such as a motor, using information about images captured by a camera.

BACKGROUND

A technique for controlling the position and posture of a robot based on information about images captured by the robot with a camera is called visual feedback. When images are captured by a camera mounted on a hand or in the neighborhood of the hand of the robot, an object can be seen in a larger field of view than in a case where the object is captured in an overhead view. Accordingly, the position and posture can be accurately controlled within the image resolution range.

A method of incorporating changes in the image feature amounts of an object into the feedback loop of the robot is called a feature-based method, and according to the method, it is necessary to determine an image Jacobian representing the ratios between changes in image feature amounts and changes in the joint shaft angles of the robot. However, the frame rate of a general-purpose camera is approximately 30 to 60 fps, which is much lower than the control cycles of the robot. Therefore, image feature amounts need to be temporally interpolated to be synchronized with the robot control cycles, and image feature amounts that take into account the movement of the robot in an image need to be estimated.

Depending on the hardware constraints of a robot, the robot cannot move along a target trajectory in some cases. This happens due to a rapid change in the joint shaft angle velocity when a target value is set at or in the neighborhood of a singular point at which there exist an infinite number of solutions to satisfy the joint movement range and the target position and posture of the robot. When a robot cannot be controlled as above, the region is stored as the robot movement inhibiting region, according to a known method of solving the problem.

However, it is not yet known how to calculate a new target value while avoiding such a movement inhibiting region. When a target value is set in the neighborhood of a singular point, the target value can be passed through by sufficiently lowering the velocity on the target trajectory. Therefore, the calculation of the target trajectory in an image is critical.

DETAILED DESCRIPTION

According to an embodiment, a robot control apparatus that controls a robot having multiple joints, based on an image feature amount captured by a camera, the robot control apparatus comprising: an actuator configured to drive a joint shaft of the robot in each control cycle; a joint shaft angle sensor sensing a joint shaft angle of the joint shaft; an image capturing unit configured to obtain the image captured by the camera; an image feature amount calculating unit configured to calculate a first image feature amount representing a feature of an object, from the image captured by the camera; an image feature amount estimating unit configured to temporally interpolate the first image feature amount, and estimate a second image feature amount in each control cycle of the robot; an image Jacobian calculating unit configured to calculate an image Jacobian representing a ratio between a change in the estimated second image feature amount and a change in the joint shaft angle; a target value input unit configured to set a target value in the image of the object; a target trajectory generating unit configure to generate a target trajectory in the image in each control cycle of the robot, using the set target value and the second image feature amount; a joint shaft angle difference calculating unit configured to calculate a difference in the joint shaft angle, using the generated target trajectory and the calculated image Jacobian; a torque command value calculating unit configured to determine a command value of the joint shaft angle based on the calculated difference in the joint shaft angle, and calculate a torque command value of the joint shaft by using the command value of the joint shaft angle and the sensed joint shaft angle; a drive unit configured to drive the actuator, based on the torque command value; and a position and posture evaluating unit configured to calculate a correction amount for the target trajectory of the image feature amount from the sensed joint shaft angle, based on a hardware constraint on the robot, the calculated correction amount for the target trajectory being used to perform feedback-control on the robot.

The following is a description of embodiments, with reference to the accompanying drawings. In the drawings, components which are identical with or similar to each other are denoted by reference numerals which are identical with or similar to each other. However, the drawings are merely schematic, and specific sizes should be determined in conjunction with the following description. Further, it is needless to say that the relative sizes and proportions vary among the drawings.

First Embodiment

Figure 1:
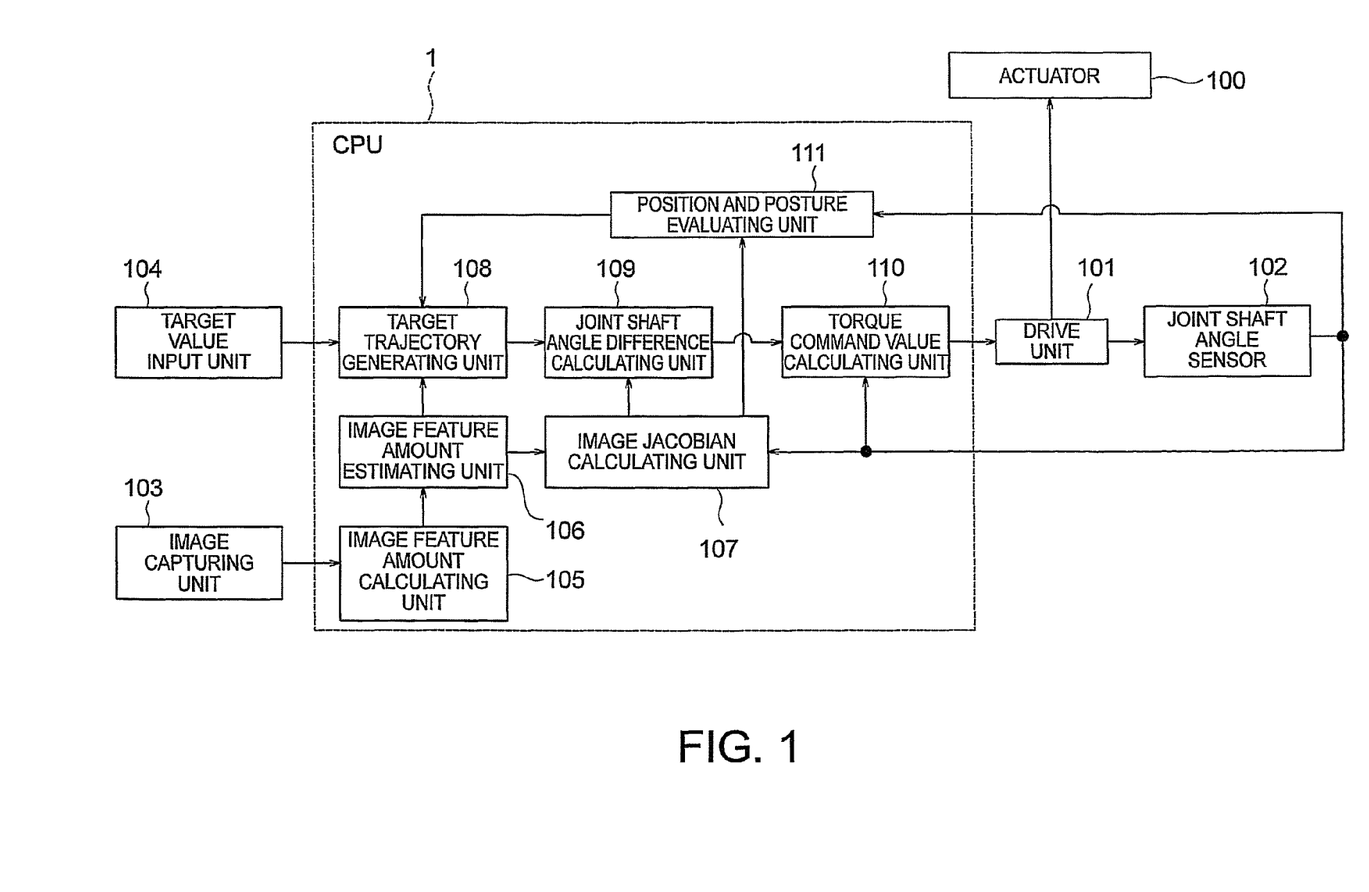
FIG. 1 is a block diagram of a robot control apparatus according to a first embodiment.

A robot control apparatus according to a first embodiment controls a robot having multiple joints. As shown in FIG. 1, the robot control apparatus includes a central processing unit (hereinafter also referred to as the CPU) 1, an actuator 100, a drive unit (also called an amplifier) 101, a joint shaft angle sensor 102, an image capturing unit 103 having a camera, and a target value input unit 104.

The joint shaft angle sensor 102 can be a position sensor such as an encoder, and may include a filter that removes predetermined frequency components. When a joint shaft is formed from a drive shaft via a transfer mechanism, and a sensor is attached to the drive shaft, the joint shaft angle is calculated from displacement of the position of the drive shaft (the drive shaft angle) in accordance with the ratio between the joint shaft and the drive shaft of the transfer mechanism.

The target value input unit 104 establishes the position and posture that form the ultimate attainment target values of the robot. The ultimate attainment target values may be stored beforehand in a database, or may be interactively provided by a user through a graphical user interface (GUI).

The CPU 1 shown in FIG. 1 logically includes an image feature amount calculating unit 105, an image feature amount estimating unit 106, an image Jacobian calculating unit 107, a target trajectory generating unit 108, a joint shaft angle difference calculating unit 109, a torque command value calculating unit 110, and a position and posture evaluating unit 111. The CPU 1 includes those components as modules (logic circuits) that are hardware resources.

The image feature amount calculating unit 105 performs image processing on an image captured by the image capturing unit 103, to calculate image feature amounts that are indicative of the features of the object. The image feature amounts are formed by numerically vectorizing the gravity center position, the posture, the color distribution, the brightness gradient pattern distribution, and the like in the image of the object. Since image processing normally involves complicated arithmetic operations, the image capturing unit 103 and the image feature amount calculating unit 105 may be formed in a CPU other than the CPU 1, and the results (the image feature amounts) of the calculations performed by the image feature amount calculating unit 105 may be transferred via a network or the like.

The image feature amount estimating unit 106 temporally interpolates the image feature amounts calculated by the image feature amount calculating unit 105, and estimates or predicts the image feature amounts in the next step (the control operation after the next control cycle). The cycles of capturing an image with the camera of the image capturing unit 103 are much lower than the cycles of controlling the robot. Therefore, to generate a smooth target trajectory in an image, it is necessary to estimate or predict the image feature amounts between the image feature amounts obtained in the previous step (the image capturing operation in the previous capturing cycle) and the image feature amounts to be obtained in the next step (the image capturing operation after the next capturing cycle). Examples of estimating or predicting techniques include a linear interpolation technique that is the simplest technique, an estimating technique involving a Kalman filter, and the like, and one of those techniques can be used.

The image Jacobian calculating unit 107 calculates an image Jacobian from the image feature amounts calculated by the image feature amount estimating unit 106. An image Jacobian is a matrix that represents the microdisplacement relation between the changes (or differences) in the image feature amounts during each robot control cycle and the changes in the joint shaft angles of the control robot during each corresponding robot control cycle. Where $J_{img}$ represents the image Jacobian, and $\Delta\xi$ represents the changes in the image feature amounts, the differences $\Delta\theta$ in the joint shaft angles of the robot satisfies the relationship expressed by the arithmetic formula (1).

$$\Delta\xi = J_{img}\Delta\theta \quad (1)$$

Where the number of image feature amounts to be controlled is m, and the number of joint axes to be controlled is n, $\Delta\xi$ and $\Delta\theta$ represent an m-dimensional vector and an n-dimensional vector, respectively. Where $J_{ij}$ represents the component on the ith ($1 \leq i \leq m$) row and the jth ($1 \leq j \leq n$) column of the image Jacobian $J_{img}$, $\Delta\xi_i$ represents the i-th row component of $\Delta\xi$, and $\Delta\theta_j$ represents the j-th column component of $\Delta\theta$, $\Delta\xi_i$ is expressed by the following arithmetic formula.

$$\Delta\xi_i = \sum_{j=1}^{n} J_{ij}\Delta\theta_j$$

If the parameters that define the coordinate system of the camera and the robot are unclear or include an error, it is necessary to estimate an image Jacobian online. By using the iterative least-squares method, for example, an image Jacobian can be estimated from the data about the image feature amounts $\xi$ and the joint shaft angles $\theta$ (see Koh Hosoda and Minoru Asada, "Adaptive Visual Servoing Controller with Feedforward Compensator without Knowledge of True Jacobian", Journal of the Robotics Society of Japan, Vol. 14, No. 2, p.p. 159-165, 1996, for example).

The target trajectory generating unit 108 generates the target trajectory of the image feature amounts in an image during each cycle of controlling the robot, using the ultimate attainment target values established by the target value input unit 104 and the image feature amounts estimated by the image feature amount estimating unit 106.

Using the differences $\Delta\xi$ between the target trajectory generated by the target trajectory generating unit 108 and the estimated image feature amounts, and a pseudo inverse matrix $J^+_{img}$ of the image Jacobian $J_{img}$, the joint shaft angle difference calculating unit 109 calculates the joint shaft angle differences $\Delta\theta$, according to the following arithmetic formula (2).

$$\Delta\theta = J^+_{img}\Delta\xi \quad (2)$$

A pseudo inverse matrix is calculated from a matrix by a known technique (by the Moore-Penrose technique, for example).

The torque command value calculating unit 110 calculates a joint shaft angle command value by integrating the joint shaft angle differences calculated by the joint shaft angle difference calculating unit 109. Based on the joint shaft angle command value and the joint shaft angles of the robot sensed by the joint shaft angle sensor 102, the torque command value calculating unit 110 calculates torque command values (control target values).

In accordance with the torque command values calculated by the torque command value calculating unit 110, the drive unit 101 drives the actuator 100 in each control cycle.

The position and posture evaluating unit 111 calculates a correction amount for the target trajectory of the image feature amounts from the joint shaft angles of the robot sensed by the joint shaft angle sensor 102, based on the hardware constraints of the robot. For example, in a case where the joint shaft angle $\theta_i$ of the i-th joint shaft of the robot is becoming closer to the maximum movement-limitation value $\theta_{i,max}$, a joint shaft angle correction amount $\Delta\theta_{comp}$ that becomes more and more different from the limiting value as indicated by the following arithmetic formula (3) is calculated by using a correction amount $\Delta\theta_i$.

$$\Delta\theta_{comp} = [0, \ldots, -\Delta\theta_i, \ldots, 0]^T \quad (3)$$

The correction amount $\Delta\theta_i$ can be a fixed value or can be determined by a function depending on the distance to the movement limitation, as indicated by the following arithmetic formula (4).

$$\Delta\theta_i = f(\theta_i - \Delta\theta_{i,max}) \quad (4)$$

The correction amount $\Delta\xi_{comp}$ for the target trajectory of the image feature amounts is calculated from the calculated joint shaft angle correction amount $\Delta\theta_{comp}$, according to the following arithmetic formula (5) using the image Jacobian calculated by the image Jacobian calculating unit 107.

$$\Delta\xi_{comp}=J_{img}\Delta\theta_{comp} \quad (5)$$

Likewise, in a case where the joint shaft angle $\theta_i$ is becoming closer to the minimum movement-limitation value $\theta_{i,min}$, the joint shaft angle correction amount $\Delta\theta_{comp}$ is calculated by using the correction amount $\Delta\theta_i$, as indicated by the arithmetic formula (6).

$$\Delta\theta_{comp}=[0,\ldots,\Delta\theta_i,\ldots,0]^T \quad (6)$$

The correction amount $\Delta\theta_i$ is determined by a function depending on the distance to the movement limitation, as indicated by the following arithmetic formula (7).

$$\Delta\theta_i=f(\theta_i-\Delta\theta_{i,min}) \quad (7)$$

(Operation of the Control Apparatus)

Figure 2:
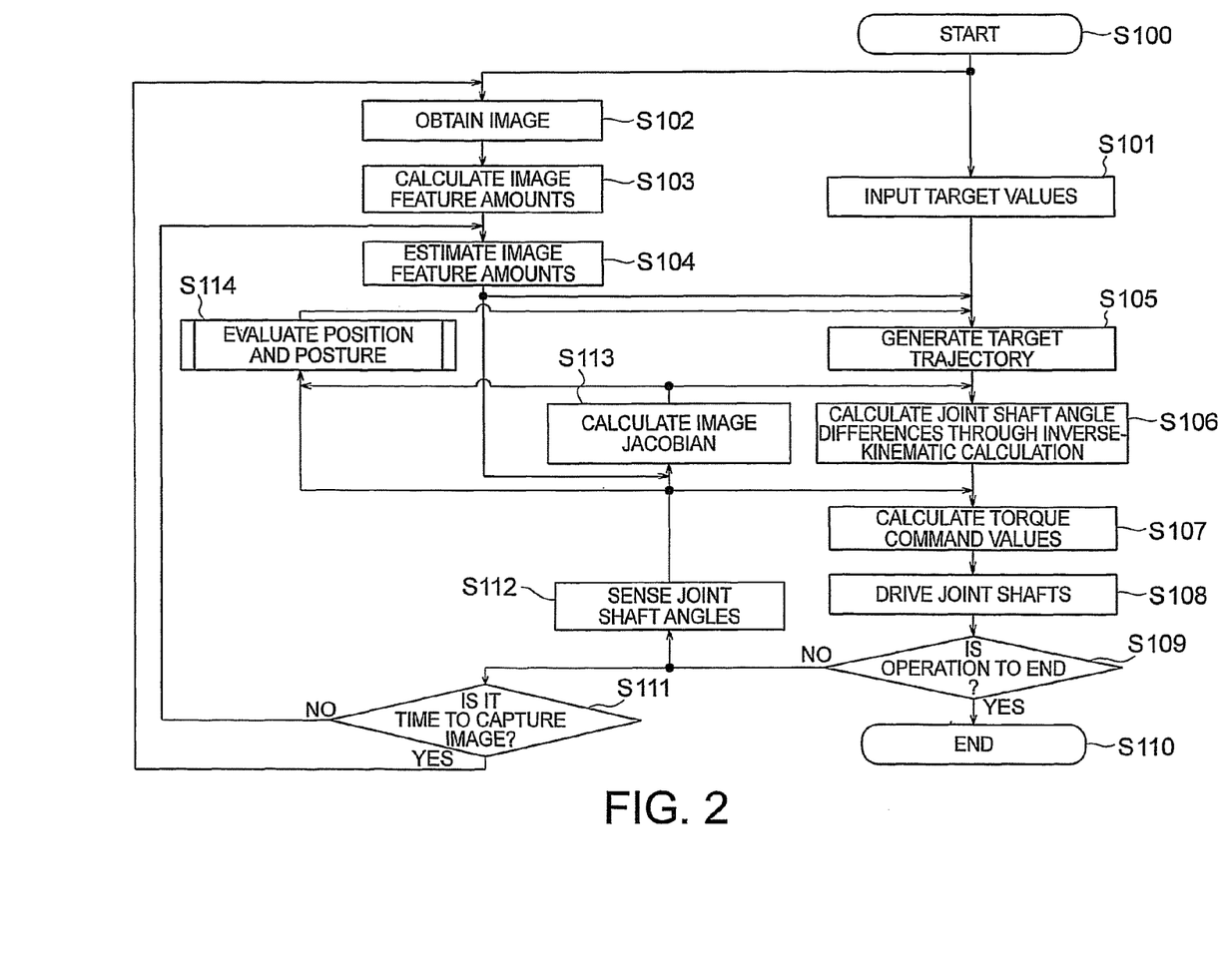
FIG. 2 is a flowchart showing an operation of the robot control apparatus according to the first embodiment.

Referring now to the flowchart shown in FIG. 2, the operation of the robot control apparatus according to this embodiment is described.

(a) First, a control operation is started, and the target value input unit 104 generates target values in an image (S100, S101). An image is obtained from the camera of the image capturing unit 103 (S102). The image feature amount calculating unit 105 calculates the image feature amounts (S103). The image feature amount estimating unit 106 temporally interpolates the image feature amounts calculated by the image feature amount calculating unit 105, and estimates or predicts the image feature amounts in the next control cycle (S104).

Based on the target values in an image that are input from the target value input unit 104 and the image feature amounts calculated by the image feature amount estimating unit 106, the target trajectory generating unit 108 generates the changes $\Delta\xi$ in the image feature amounts, taking into account the later described correction amount for the target trajectory with respect to the image feature amounts (S105). As indicated by the arithmetic formula (2) using the image Jacobian calculated by the image Jacobian calculating unit 107, an inverse-kinematic calculation is performed on the image feature amount changes $\Delta\xi$ generated by the target trajectory generating unit 108, to calculate the joint shaft angle differences $\Delta\theta$ (S106).

After that, the torque command value calculating unit 110 calculates the joint shaft angle target value by integrating the joint shaft angle differences $\Delta\theta$ calculated by the joint shaft angle difference calculating unit 109, and calculates the torque command values from the later described joint shaft angles sensed by the joint shaft angle sensor 102 (S107).

Using the control target values that are the torque command values calculated by the torque command value calculating unit 110, the drive unit 101 drives the actuator 100, to control the robot (S108).

A check is then made to determine whether the control operation is to end (S109). If the control operation is to end, the servoing process comes to an end (S110). If the control operation is not to end in step S109, the operation moves on to step S112 or step S111.

(b) When the operation moves on to step S112, the joint shaft angles are sensed by the joint shaft angle sensor 102. Using the joint shaft angles sensed by the joint shaft angle sensor 102 and the image feature amounts calculated by the image feature amount estimating unit 106, the image Jacobian calculating unit 107 calculates the image Jacobian (S113). Using the joint shaft angles sensed by the joint shaft angle sensor 102 and the image Jacobian calculated by the image Jacobian calculating unit 107, the position and posture evaluating unit 111 calculates the correction amount for the target trajectory of the image feature amounts (S114). The operation then returns to step S105 to calculate the target trajectory of the image feature amounts, and the procedures of steps S105 through S109 are repeated.

(c) When the operation moves on to step S111, a check is made to determine whether it is time to capture an image. If it is time to capture an image, the operation returns to step S102. If it is not time to capture an image, the operation returns to step S104 to temporally interpolate and estimate the image feature amounts in the next control cycle from the image feature amounts estimated or predicted from the image captured at the previous image capturing time. In this manner, the image feature amounts to be used in generating the target trajectory in step S105 are obtained.

As described above, according to this embodiment, the correction amount for the target trajectory of the image feature amounts are calculated based on the hardware constraints of the robot, and control is performed by using the target trajectory correction amount. Accordingly, the robot can be stably controlled. That is, stable visual feedback can be realized while the hardware constrains of the robot are being taken into account.

(First Modification)

A robot control apparatus according to a first modification of this embodiment is described. The control apparatus of the first modification differs from the control apparatus of the first embodiment in the evaluation method used by the position and posture evaluating unit 111. In the first embodiment, in the evaluating operation performed by the position and posture evaluating unit 111, attention is drawn to the movement range of the joints. When a joint is approaching the movement limitation, the correction amount for the target trajectory of the image feature amounts is calculated from the joint shaft angle correction amounts designed for correcting the joints toward the opposite direction from the movement limitation. The hardware constraints of a robot normally include a singular point. A singular point indicates a state where an infinite number of joint shaft angles for realizing the target position and posture of the robot exist and become indefinite. It is known that the degree of approximation to the singular point is evaluated by using the manipulability. The manipulability $\kappa(J)$ is calculated from a Jacobian matrix by using the following arithmetic formula (8).

$$\kappa(J)=(\det(JJ^T))^{1/2} \quad (8)$$

At this point, $J^T$ represents the transpose of the Jacobian matrix J, and $\det(JJ^T)$ represents the determinant of the matrix $JJ^T$.

By applying the manipulability to the image Jacobian $J_{img}$, the target trajectory is corrected through the singular point evaluation. Since each joint angular velocity becomes rapidly higher in the neighborhood of a singular point, the target velocity needs to be reduced. In view of this, a suppression gain K that is set as shown by the following arithmetic formula (9) is determined.

where $\kappa(J_{img})<\kappa(J_0)$, $K=(\kappa(J_{img})/\kappa(J_0))^2$, and where $\kappa(J_{img})\geq\kappa(J_0)$, $K=1$ \quad (9)

In other words, K is a value that is larger than 0 but is not larger than 1. It should be noted that the image Jacobian $J_0$ serving as the threshold value is set in advance.

After that, the obtained suppression gain K is multiplied by the differences $\Delta\xi$ in the image feature amounts that are input to the joint shaft angle difference calculating unit 109. The multiplied values (=K·$\Delta\xi$) are assigned as the corrected differences in the image feature amounts to the arithmetic formula (2), to determine the correction amount for the target trajectory of the image feature amounts in the same manner as in the first embodiment.

As described above, the control apparatus of the first modification corrects the target trajectory through a singular point evaluation, and then lowers the target velocity. Accordingly, even if the target trajectory is set in the neighborhood of a singular point, the robot can be stably controlled. That is, stable visual feedback can be realized while the hardware constraints on the robot are being taken into account.

(Second Modification)

Figure 3:
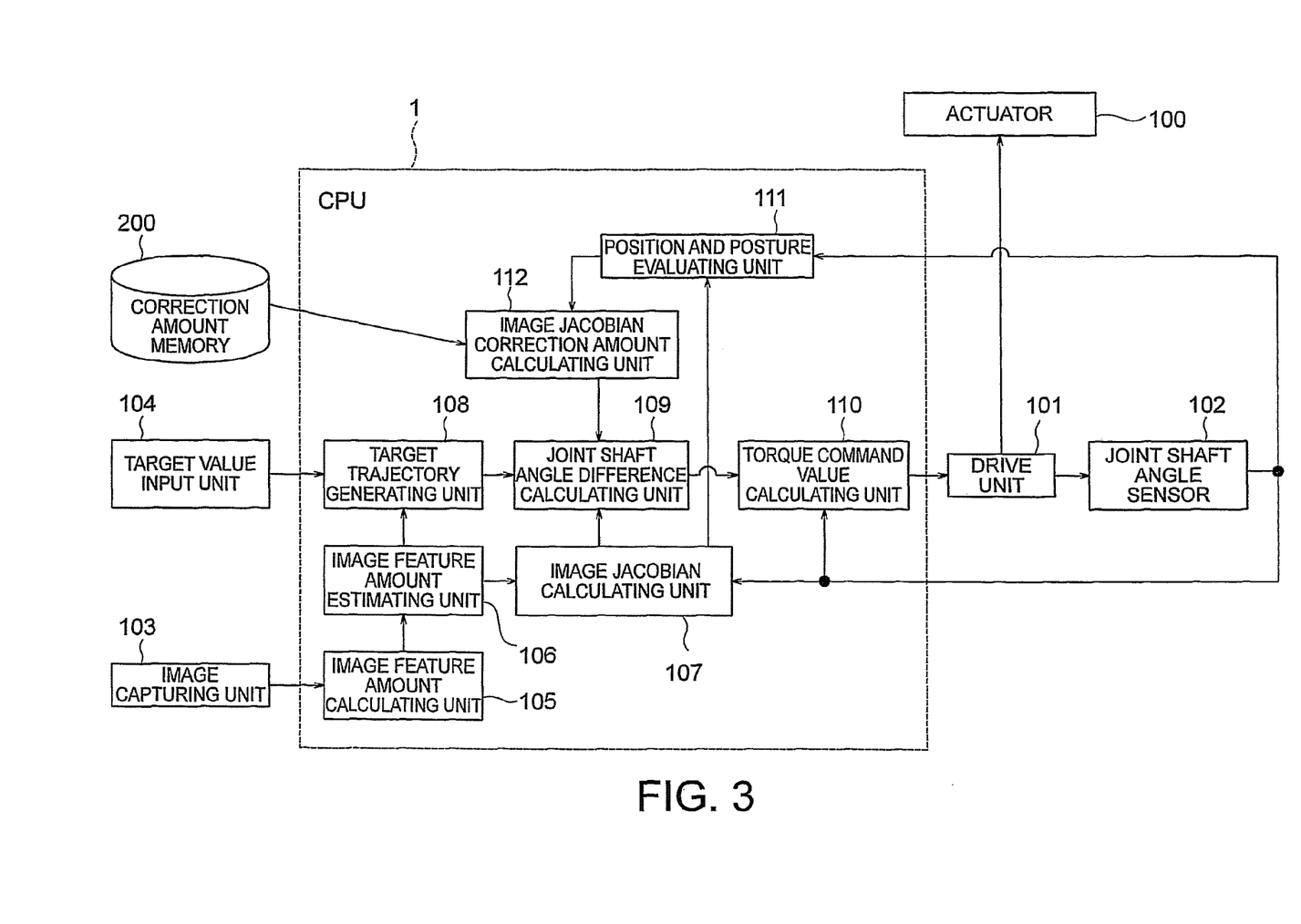
FIG. 3 is a block diagram of a robot control apparatus according to a second modification of the first embodiment.

Referring now to FIG. 3, a robot control apparatus according to a second modification of the first embodiment is described.

When a joint shaft is approaching a singular point as in the first modification, the joint angular velocity cannot be sufficiently reduced simply through a decrease in velocity in some cases. This is because the image Jacobian becomes short of ranks, and a pseudo inverse matrix cannot be calculated.

To solve such a problem, the control apparatus of the second modification includes an image Jacobian correction amount calculating unit 112 and a correction amount memory 200 as well as the same components as those of the control apparatus of the first embodiment. The position and posture evaluating unit 111 of the second modification differs from the position and posture evaluating unit 111 of the first embodiment in calculating the image Jacobian manipulability $\kappa$ described in the first modification. The image Jacobian correction amount calculating unit 112 is formed in the CPU 1, and calculates a correction amount a shown by the following arithmetic formula (10) when determining that a joint shaft is approaching a singularity posture from the image Jacobian manipulability $\kappa$ calculated by the position and posture evaluating unit 111.

$$\text{where } \kappa(J_{img}) < \kappa(J_0),\ \alpha = \alpha_0(1 - \kappa(J_{img})/\kappa(J_0)),\ \text{and}$$

$$\text{where } \kappa(J_{img}) \geq \kappa(J_0),\ \alpha = 0 \tag{10}$$

At this point, the parameter $\alpha_0$ is appropriately set in advance. The correction amount memory 200 stores the image Jacobian correction amount $\alpha$ calculated by the image Jacobian correction amount calculating unit 112.

The joint shaft angle difference calculating unit 109 adds the image Jacobian correction amount a to the image Jacobian $J_{img}$, and then performs calculations in the same manner as in the first embodiment. Specifically, the image Jacobian correction amount $\alpha$ is added to the image Jacobian $J_{img}$ in the following manner.

First, both sides of the equation (1) are multiplied by the transpose $J^T_{img}$ of the image Jacobian $J_{img}$.

$$J^T_{img}\Delta\xi = J^T_{img}J_{img}\Delta\theta \tag{11}$$

The square matrix $J^T_{img}J_{img}$ of the right side of the arithmetic formula (11) is then replaced with the matrix (=$J^T_{img}J_{img}+\alpha I$) formed by adding the image Jacobian correction amount $\alpha$ calculated by using the arithmetic formula (10) to the diagonal component of the square matrix $J^T_{img}J_{img}$ of the right side of the arithmetic formula (11), to obtain the following arithmetic formula (12).

$$J^T_{img}\Delta\xi = (J^T_{img}J_{img}+\alpha I)\Delta\theta \tag{12}$$

At this point, I represents the unit matrix. By using the inverse matrix of the matrix ($J^T_{img}J_{img}+\alpha I$), the joint shaft angle differences $\Delta\theta$ are calculated according to the following arithmetic formula (13).

$$\Delta\theta (J^T_{img}J_{img}+\alpha I)^{-1} J^T_{img}\Delta\xi \tag{13}$$

Accordingly, in the second modification, the matrix ($J^T_{img}J_{img}+\alpha I$)$^{-1} J^T_{img}$ is a corrected pseudo inverse matrix of the image Jacobian.

The correction amount memory 200 may be a semiconductor memory, a magnetic disk, an optical disk, a magnetooptical disk, or a magnetic tape, for example.

As described above, in the second modification, $\alpha I$ is added to the square matrix $J^T_{img}J_{img}$ by using the correction amount $\alpha$, and $\Delta\theta$ is determined by using the resultant square matrix (=$J^T_{img}J_{img}+\alpha I$). Since the resultant square matrix (=$J^T_{img}J_{img}+\alpha I$) is a normal matrix, the image Jacobian does not become short of ranks. Accordingly, a corrected pseudo inverse matrix can be calculated. Thus, even when a joint shaft is approaching a singular point, the joint shaft angular velocity can be sufficiently lowered.

That is, in the second modification, stable visual feedback can also be realized while the hardware constrains of the robot are being taken into account, as in the first embodiment.

It should be noted that the first modification and the second modification may be used at the same time. Specifically, a control operation may be performed to operate the robot in a more stable manner by lowering the velocity on the target trajectory of the image feature amounts while correcting the image Jacobian.

(Third Modification)

Figure 4:
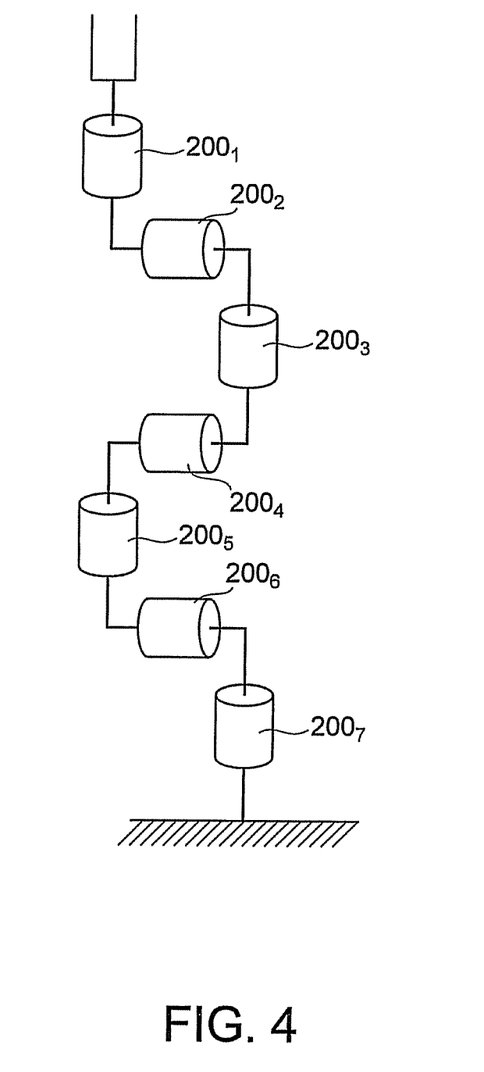
FIG. 4 is a diagram showing an example of a robot having a redundant degree of freedom.

As a third modification of this embodiment, a control operation performed by a robot having a redundant degree of freedom is described. FIG. 4 schematically shows an example of a robot having a redundant degree of freedom. The robot shown in FIG. 4 can control the three-dimensional position and posture of the arm thereof, and includes seven joints $200_1$ through $200_7$. That is, the robot has seven degrees of freedom, which is more than the six degrees of freedom to be controlled (the three degrees of freedom in positions X, Y, and Z, and the three degrees of freedom in postures taken through rotations about the respective axes). Therefore, the robot is called a kinematically redundant robot. This kinematically redundant robot has an infinite number of joint shaft angles that can realize the target position and posture. Therefore, by using the extra degree of freedom, it is possible to take a posture that avoids the movement ranges of the joint shafts and the singular point. In this manner, an operation can be performed only through a control operation performed inside the robot, without a correction of a target value in an image. It is preferable to use the robot control apparatus of the second modification in the control operation by the kinematically redundant robot.

Example Application of the First Embodiment

A robot to which the first embodiment is applied can realize the following actions and operations, for example. A multi-joint robot having an object-holding hand and a camera mounted on a top end portion thereof detects a marker in a camera image, and approaches the designated position and posture. Upon coming close to an object, the robot opens the hand and holds the object. The robot then carries the object to another place, and performs an insertion process. The robot detects a different marker that is attached to the task area and is different from the previous one. The robot then approaches the designated position and posture, and pushes the object in, thereby completing the insertion process.

Second Embodiment

Figure 5:
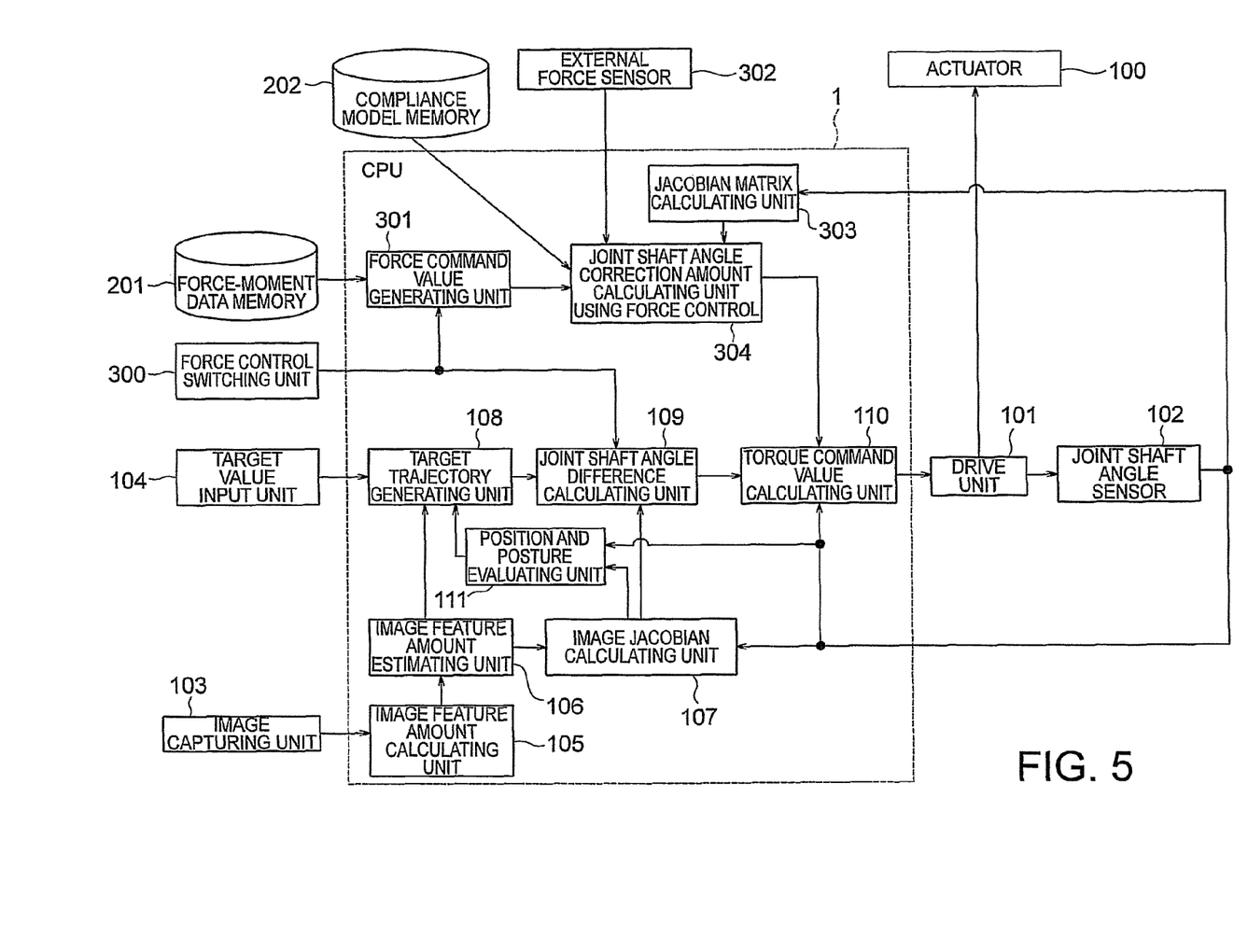
FIG. 5 is a block diagram of a robot control apparatus according to a second embodiment.

Referring now to FIG. 5, a robot control apparatus according to a second embodiment is described.

In the second embodiment, an external force acting on a robot is detected in a process as described in the example application of the first embodiment, and force control is performed based on a set compliance model. In this manner, flexible operations are performed. Accordingly, operations using visual feedback can be more safely performed.

FIG. 5 shows the robot control apparatus according to the second embodiment. The control apparatus of the second embodiment is the same as the robot control apparatus of the first embodiment, except for further including a force/moment data memory 201, a compliance model memory 202, a force control switching unit 300, a force command value generating unit 301, an external force sensor 302, a Jacobian matrix calculating unit 303, and a joint shaft angle correction amount calculating unit 304 using force control. The force command value generating unit 301, the Jacobian matrix calculating unit 303, and the joint shaft angle correction amount calculating unit 304 using force control are formed in the CPU 1.

When a user inputs an instruction as to whether force control is applied is input through a GUI or script, the force control switching unit 300 sends a trigger so that the force or moment target value stored in the force/moment data memory 201 is followed.

Receiving the trigger from the force control switching unit 300, the force command value generating unit 301 generates such a force command value that the force or moment target value stored in the force/moment data memory 201 is followed in each control cycle.

The external force sensor 302 includes a force sensor in the neighborhood of the top end, and senses an external force acting on the robot. Such an external force may not be sensed by a sensor, and be estimated from a disturbance torque that is calculated from torque command values and joint shaft angles by using a kinetic model.

The Jacobian matrix calculating unit 303 calculates a Jacobian matrix from joint shaft angles sensed by the joint shaft angle sensor 102.

The joint shaft angle correction amount calculating unit 304 using force control reads compliance model parameters from the compliance model memory 202, and calculates a position correction amount in accordance with the force error $\Delta f$ that is the difference between the force command value generated by the force command value generating unit 301 and the external force sensed by the external force sensor 302. If the force control is not valid, the force command value is not generated, and the force error $\Delta f$ becomes equal to the external force. At this point, the compliance model includes virtual inertia, viscosity, stiffness with respect to the contact object, as shown by the arithmetic formula (14), for example.

$$Md^2\Delta x/dt^2 + Dd\Delta x/dt + K\Delta x = K_f \Delta f \quad (14)$$

At this point, $\Delta x$ represents the position error vector in the task coordinate system set for the joint to which the external force is applied, $d\Delta x/dt$ represents the velocity vector in the task coordinate system, $d^2\Delta x/dt^2$ represents the acceleration vector in the task coordinate system, M represents an inertia matrix, D represents a viscosity coefficient matrix, K represents a stiffness coefficient matrix, and $K_f$ represents a force feedback gain matrix. The compliance select matrix for switching axes to which a force and a position are applied is contained in the force feedback gain matrix $K_f$. The velocity vector $d\Delta x/dt$ and the acceleration vector $d^2\Delta x/dt^2$ of the error can be approximated by a first-order difference and a second-order difference in the position error vector $\Delta x$ with respect to time. Therefore, the compliance correction amount $\Delta x_{comp}$ at the joint to which the external force is applied can be calculated according to the following arithmetic formula (15).

$$\Delta x_{comp} = 1/K(K_f \Delta f - Md^2\Delta x/dt^2 - Dd\Delta x/dt) \quad (15)$$

The joint shaft angle correction amount $\Delta \theta_{comp}$ is calculated from the compliance correction amount $\Delta x_{comp}$ by using the inverse matrix of the Jacobian matrix J calculated by the Jacobian matrix calculating unit 303, according to the following arithmetic formula (16).

$$\Delta \theta_{comp} = J^{-1} \Delta x_{comp} \quad (16)$$

Receiving the trigger from the force control switching unit 300, the joint shaft angle difference calculating unit 109 does not perform the operation to calculate joint shaft angle differences, and outputs "0" as the joint shaft angle differences.

The torque command value calculating unit 110 sets a new joint shaft angle command value by adding the joint shaft angle correction amount $\Delta \theta_{comp}$ calculated by the joint shaft angle correction amount calculating unit 304 using force control to the joint shaft angle command value calculated by integrating the joint shaft angle differences calculated by the joint shaft angle difference calculating unit 109. The torque command value calculating unit 110 then generates torque command values (control target values) from the differences between the new joint shaft angle command value and the joint shaft angles calculated by the joint shaft angle sensor 102. That is, when force control is not applied (or when a trigger is not generated), the torque command value calculating unit 110 calculates the torque command values, based on the joint shaft angle command value calculated by integrating the joint shaft angle differences calculated by the joint shaft angle difference calculating unit 109 and the joint shaft angles sensed by the joint shaft angle sensor 102, as in the first embodiment. When force control is applied (or when a trigger is generated), on the other hand, the joint shaft angle correction amount $\Delta \theta_{comp}$ is set as the joint shaft angle command value, and the torque command values are calculated based on the joint shaft angle command value and the joint shaft angles sensed by the joint shaft angle sensor 102.

As described above, even where visual feedback is being performed, by detecting an external force, a flexible control operation can be performed based on the set compliance model. Further, where force control is valid, the joint shaft angle differences are not calculated even if there are differences in image feature amounts, and the joint shaft angle correction amount is calculated based on the external force sensed by the external force sensor 302 so that the force or moment target value is followed. In a contact state, the information about forces is prioritized over images. This is because image data contains camera parameter errors and calibration errors, and, if tasks are continued while the external force is being ignored, the object might be damaged.

(Robot Control Method)

Figure 6:
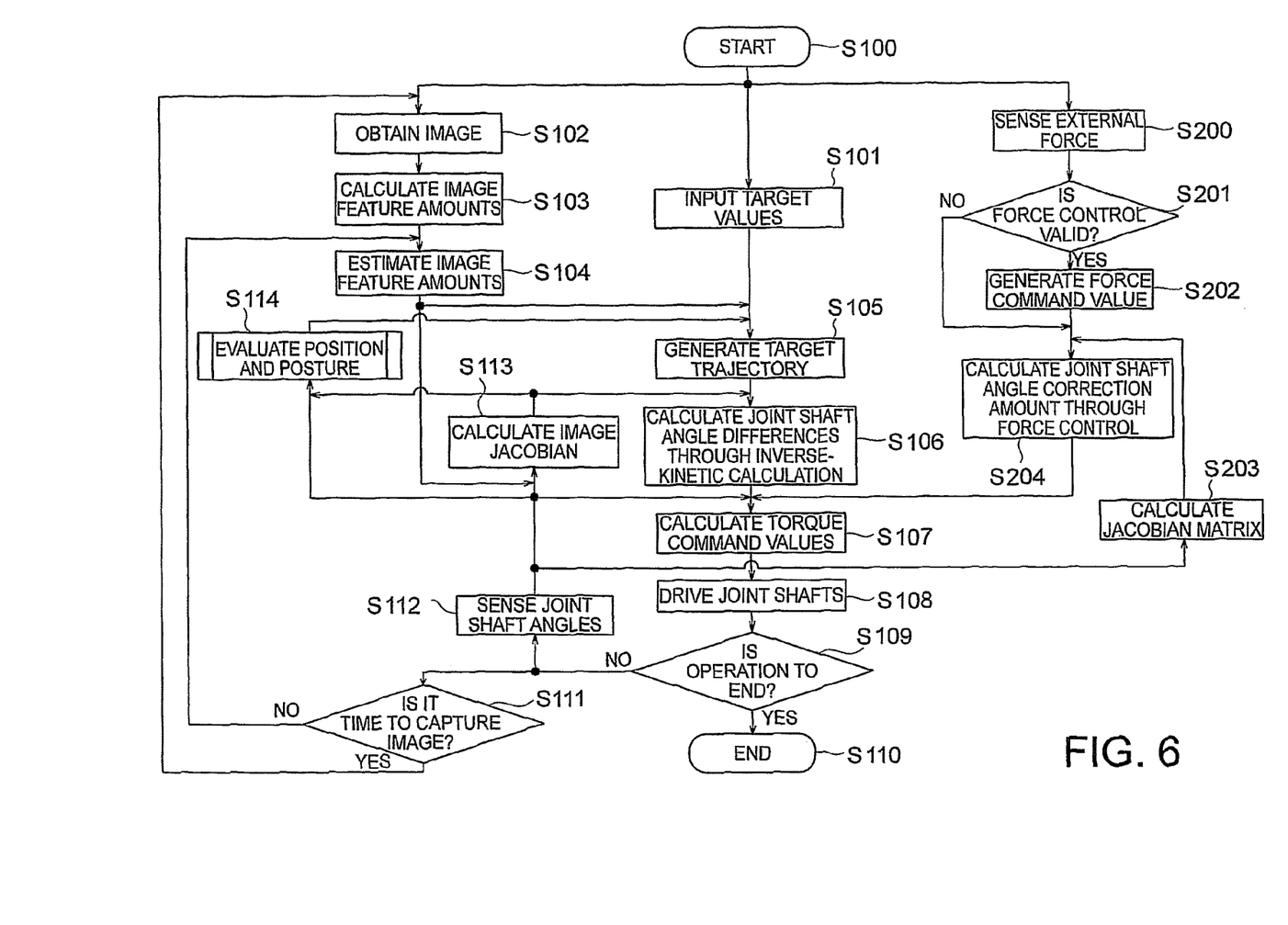
FIG. 6 is a flowchart showing an operation of the robot control apparatus according to the second embodiment.

Referring now to the flowchart shown in FIG. 6, the operation of the robot control apparatus according to the second embodiment is described. It should be noted that explanation of the same aspects as those shown in FIG. 2 is omitted herein.

(a) First, a control operation is started, and the external force sensor 302 calculates an external force (S100, S200). In step S201, a check is made to determine whether the force control has been made valid by the force control switching unit 300. If the force control is valid, the operation moves on to step S202. If the force control is not valid, the operation moves on to step S204.

In step S202, the force command value generating unit 301 calculates the force command value.

(b) In step S203, the Jacobian matrix calculating unit 303 calculates a Jacobian matrix from the joint shaft angles calculated in step S112.

(c) In step S204, the joint shaft angle correction amount calculating unit 304 using force control calculates the joint shaft angle correction amount from the force command value generated by the force command value generating unit 301, the external force sensed by the external force sensor 302, the compliance model parameters stored in the compliance model memory 202, and the Jacobian matrix calculated by the Jacobian matrix calculating unit 303, according to the arithmetic formulas (14), (15), and (16).

(d) In step S107, the joint shaft angle correction amount calculated by the joint shaft angle correction amount calculating unit 304 using force control is added to the joint shaft angle target value calculated by integrating the joint shaft angle differences calculated by the joint shaft angle difference calculating unit 109, to obtain a new joint shaft angle target value. The torque command value calculating unit 110 then calculates the torque command values from the new joint shaft angle target value and the joint shaft angles calculated by the joint shaft angle sensor 102.

As described above, in the second embodiment, the same control as that of the first embodiment is performed when the force control is not applied. Accordingly, stable visual feedback can be realized while the hardware constraints of the robot are being taken into account, as in the first embodiment. When the force control is applied, by sensing the external force even while visual feedback is being performed, a flexible control operation can be performed based on the set compliance model. Further, when the force control becomes valid, the joint shaft angle differences are not calculated even if there are differences in image feature amounts, and the joint shaft angle correction amount is calculated based on the external force sensed by the external sensor 302 so that the force or moment target value is followed. That is, in a contact state, the information about forces is prioritized over images. Accordingly, damage to the object can be prevented.

(Other Modifications)

In the second embodiment, the robot control operation performed when the force control is made valid is added to the first embodiment. Therefore, the same control operations as those according to the first through third modifications of the first embodiment can be performed.

Other Embodiments

For example, in the above embodiments, the CPU 1, the image capturing unit 103, the target value input unit 104, the correction amount memory 200, the force/moment data memory 201, the compliance model memory 202, and the like may be integrally embedded inside the robot to be controlled. Further, the CPU 1, the image capturing unit 103, the target value input unit 104, the correction amount memory 200, the force/moment data memory 201, the compliance model memory 202, and the like may be provided outside the robot to be controlled, and the robot can be remote-controlled in a wired or wireless manner.

As described so far, each of the embodiments of the present invention can provide a robot control apparatus that is capable of realizing stable visual feedback while taking into account the hardware constraints on the robot.

While certain embodiments have been described, these embodiments have been presented by way of example only, and are not intended to limit the scope of the inventions. Indeed, the novel methods and systems described herein can be embodied in a variety of other forms; furthermore, various omissions, substitutions and changes in the form of the methods and systems described herein can be made without departing from the spirit of the inventions. The accompanying claims and their equivalents are intended to cover such forms or modifications as would fall within the scope and spirit of the inventions.

What is claimed is:

1. A robot control apparatus that controls a robot having multiple joints, based on an image feature amount captured by a camera, the robot control apparatus comprising:

an actuator configured to drive a joint shaft of the robot in each control cycle;

a joint shaft angle sensor sensing a joint shaft angle of the joint shaft;

an image capturing unit configured to obtain the image captured by the camera;

an image feature amount calculating unit configured to calculate a first image feature amount representing a feature of an object, from the image captured by the camera;

an image feature amount estimating unit configured to temporally interpolate the first image feature amount, and estimate a second image feature amount in each control cycle of the robot;

an image Jacobian calculating unit configured to calculate an image Jacobian representing a ratio between a change in the second image feature amount and a change in the joint shaft angle;

a target value input unit configured to set a target value in the image of the object;

a target trajectory generating unit configure to generate a target trajectory in the image in each control cycle of the robot, using the target value and the second image feature amount;

a joint shaft angle difference calculating unit configured to calculate a difference in the joint shaft angle, using the generated target trajectory and the image Jacobian;

a torque command value calculating unit configured to determine a command value of the joint shaft angle based on the difference in the joint shaft angle, and calculate a torque command value of the joint shaft by using the command value of the joint shaft angle and the joint shaft angle sensed by the joint shaft angle sensor;

a drive unit configured to drive the actuator, based on the torque command value; and a position and posture evaluating unit configured to calculate a correction amount for the target trajectory of the image feature amount from the joint shaft angle sensed by the joint shaft angle sensor, based on a hardware constraint on the robot, the correction amount for the target trajectory being used to perform feedback-control on the robot.

2. The apparatus according to claim 1, wherein the position and posture evaluating unit calculates a movement range of the robot and a manipulability of the image Jacobian, and calculates the correction amount for the target trajectory in the image by using the manipulability, the manipulability representing a degree of approximation to a singular point.

3. The apparatus according to claim 1, wherein the position and posture evaluating unit calculates a movement range of the robot and a manipulability of the image Jacobian, the manipulability representing a degree of approximation to a singular point, the robot control apparatus further comprises:

an image Jacobian correction amount calculating unit configured to correct the image Jacobian; and
a correction amount memory storing a correction amount for the image Jacobian, and
the joint shaft angle difference calculating unit calculates the difference in the joint shaft angle by using the image Jacobian corrected by image Jacobian correction amount calculating unit.

4. The apparatus according to claim 3, wherein the robot is a robot having a redundant degree of freedom.

5. The apparatus according to claim 1, further comprising:
a force control switching unit configured to generate a trigger signal for making force control valid;
a force/moment data memory storing a force or moment target value to be generated when the robot comes into contact with the object;
a force command value generating unit configured to receive the trigger signal, and calculate a force command value to follow the force or moment target value stored in the force/moment data memory;
an external force sensor sensing an external force acting on the robot;
a Jacobian matrix calculating unit configured to calculate a Jacobian matrix from the joint shaft angle sensed by the joint shaft angle sensor;
a compliance model memory storing parameters of a compliance model that describes a situation where the robot and the object are in contact with each other; and
a joint shaft angle correction amount calculating unit configured to calculate a joint shaft angle correction amount, based on the force command value, the external force the parameters of the compliance model, and the Jacobian matrix,
wherein,
when the trigger signal is not generated, the torque command value calculating unit calculates the torque command value, based on the command value of the joint shaft angle and the joint shaft angle sensed by the joint shaft angle sensor, and
when the trigger signal is generated, the torque command value calculating unit determines the command value of the joint shaft angle to be the joint shaft angle correction amount calculated by the joint shaft angle correction amount calculating unit, and calculates the torque command value, based on the command value of the joint shaft angle and the joint shaft angle sensed by the joint shaft angle sensor.

* * * * *